United States Patent [19]

Welschof et al.

[11] Patent Number: 4,747,805
[45] Date of Patent: May 31, 1988

[54] PROTECTIVE BOOT ASSEMBLY FOR CONSTANT VELOCITY UNIVERSAL JOINT

[75] Inventors: Hans-Heinrich Welschof, Rodenbach; Rudolf Beier, Offenbach am Main, both of Fed. Rep. of Germany

[73] Assignee: Löhr & Bromkamp GmbH

[21] Appl. No.: 10,398

[22] Filed: Feb. 3, 1987

[30] Foreign Application Priority Data

Feb. 5, 1986 [DE] Fed. Rep. of Germany ....... 3603389

[51] Int. Cl.$^4$ ................................................ F16C 1/26
[52] U.S. Cl. .................................... 464/175; 464/906; 403/288; 403/50; 277/212 FB
[58] Field of Search .................... 403/50, 51, 288, 134; 277/212 FB; 464/905, 906, 175

[56] References Cited

U.S. PATENT DOCUMENTS

| 2,825,213 | 3/1958 | Dunn | 464/175 X |
| 3,869,878 | 3/1975 | Davies et al. | 464/906 X |
| 4,132,422 | 1/1979 | Sankey et al. | 277/212 FB |

FOREIGN PATENT DOCUMENTS

| 151898 | 1/1903 | Fed. Rep. of Germany |  |
| 2324568 | 12/1973 | Fed. Rep. of Germany |  |
| 2334480 | 1/1974 | Fed. Rep. of Germany |  |
| 2353914 | 5/1975 | Fed. Rep. of Germany | 277/212 FB |
| 763307 | 12/1956 | United Kingdom | 464/175 |
| 1218729 | 1/1971 | United Kingdom |  |
| 1480039 | 7/1977 | United Kingdom |  |
| 1486835 | 9/1977 | United Kingdom |  |

Primary Examiner—Andrew V. Kundrat
Attorney, Agent, or Firm—Toren, McGeady & Associates

[57] ABSTRACT

A protective boot for sealing the free space between the driving and driven parts of a constant velocity universal joint formed of a material which is suitable for injection molding, wherein the boot is formed with a larger outer diameter part mounted on an outer joint member of the joint and attached thereto by a relative thin-walled metal cap which, due to its resilience, is capable of sealingly pressing radial and axial sealing faces provided at the outer diameter part of the boot against an outer circumference and an end face of the outer joint member while securingly embracing them. The boot is formed with a smaller diameter part which is provided with an inwardly directed end facing the outer joint member and resting in sealing engagement against a driving shaft connected to an inner joint member of a universal joint over a defined distance. For improving production characteristics, the inwardly directed end of the boot may have a relatively short length and a resulting free space up to the axial limit of the joint inner member is bridged by a sleeve which may be of cardboard or plastic and which may have elongate slots to facilitate assembly.

4 Claims, 1 Drawing Sheet

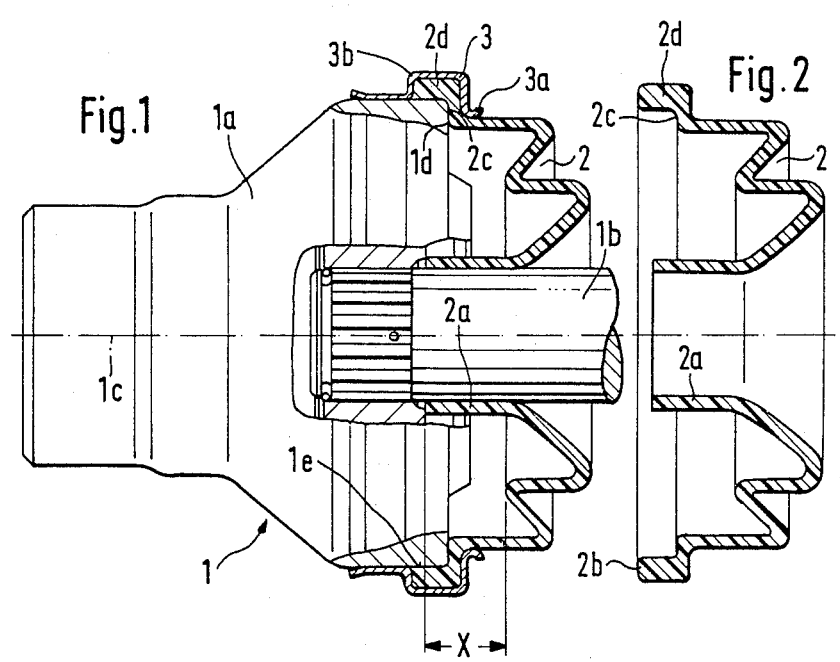
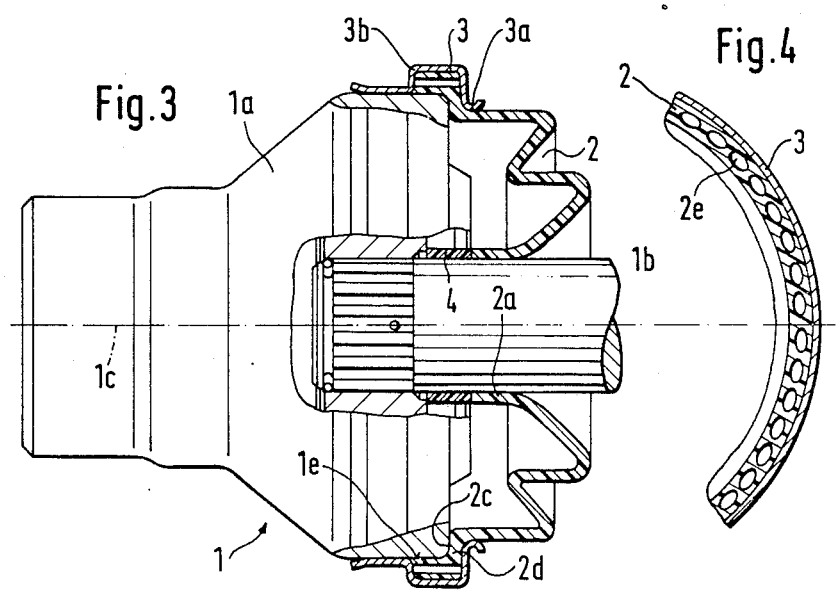

PROTECTIVE BOOT ASSEMBLY FOR CONSTANT VELOCITY UNIVERSAL JOINT

The present invention relates generally to protective boot assemblies, particularly for constant velocity universal joints or the like. More specifically, the invention is directed toward an assembly including a protective boot made especially of plastic material suitable for injection molding for bridging and sealing the free space between the driving and driven parts of the universal joint.

Universal joints of the type with which a boot of the present invention may be utilized operate to transmit torque by means of rolling members which are guided at half the joint angle together with a cage holding the rolling members, with the boot being fixed to extend between a driving and a driven part of the joint, and, in the case of which, rotation-symmetrical fixing and securing means embracing the boot have been provided.

In the prior art, DE-OS No. 23 34 480 discloses a universal joint, in the case of which, the free space between the driving and driven joint parts is bridged by a boot which has a relatively complicated design. The boot consists of two folds arranged one above the other in the radial direction having different lengths in the axial direction and relatively large transition radii. At the location of transition from one boot fold to another, the aforementioned prior art publication proposes an annular, stepped, inner projection by means of which the boot is supported in a correspondingly designed recess of a cage receiving and guiding the torque transmitting balls of the universal joint.

The assembly of such a boot also is rather complicated, especially since, on the one hand, it requires a tensioning strip in order to effect affixing to the joint inner member and since, on the other hand, its annular projection must be made to engage the projection of the cage, and finally, an annular, rotationally-shaped, relatively long metal sleeve must be pushed onto the boot exterior with the sleeve end facing the joint outer member and provided with an annular bead or the like having to be made to securely engage an annular groove, recess or the like provided at the outside of the joint outer member.

Irrespective of the production and assembly expenditure required by the boot and disclosed in prior art publication DE-OS No. 23 34 480, such a boot may meet the demands which are made upon it, especially since it is made of rubber or a similar resilient material and since, as a result of its deformability, it is capable of accommodating angular movements and axial displacement of the shaft relative to the joint outer member. However, it has been found that such a device does not meet current-day stringent requirements with regard to expenditure, geometric configuration and material.

Furthermore, the application of a boot designed in accordance with DE-OS No. 23 34 480 is limited in that there is a risk of unacceptable oil losses which could shorten the life of a universal joint and that, at best, such a boot design operates efficiently with grease instead of oil.

SUMMARY OF THE INVENTION

The present invention is directed toward providing a boot having folds which are undercut-free, thereby enabling it to be produced from a material with a relatively low degree of resilience by, for example, plastic injection or injection molding. Furthermore, the invention is directed toward providing a boot which may be machine assembled with the parts of the universal joint without requiring the use of tension strips or hose clips. Furthermore, the invention seeks to avoid special operations at the joint outer member, such as provision of an annular groove or the like. At the same time, the objective of the invention is to ensure that when the boot is affixed, it is accurately positioned axially, with the means required for this positioning being designed in such a way that they may undertake part of the function of an anti-blocking system (ABS) of the vehicle which is to be equipped.

Therefore, in accordance with the present invention, the folds of the boot of the invention are essentially arranged in a sawtooth-shaped configuration with an inwardly turned fold end facing an outer joint member of the universal joint upon which the boot is to be mounted with the inwardly turned end extending at least approximately parallel with the central axis of the joint and resting in sealing engagement against the driving part of the joint over a defined distance X. The boot is also provided with an outer fold end which is provided with a radial shoulder sealingly resting against a correspondingly designed end face formed on the outer joint member, the outer part of the boot being also formed with an axially extending portion which is supported in sealing engagement on the outer circumference of the outer joint member and which is secured by a rotation-symmetrical relatively thin cap which surrounds the outer part of the boot making use of its own resilience.

In accordance with a further embodiment of the invention, the inwardly turned fold end of the boot is designed without fixing means in such a manner that the length of the inwardly turned boot fold end extends as far as the axial limit of the inner joint part.

In an alternative embodiment of the invention, the inwardly turned fold end of the boot is designed without fixing means in such a way that the length of the inwardly turned boot fold end ends before the axial limit of the inner joint part and that the intermediate space is bridged by a sleeve or similar device.

In accordance with a further feature of the invention, the sleeve is made of cardboard, plastic or the like and may be provided with elongate slots.

In accordance with a further essential feature of the invention, operating to fix in sealed engagement both the radial and the axial boot portions at the outer joint member, provision is made for a cap having an inner diameter which is smaller than the tensioned diameter of the outer joint member.

In a further advantageous embodiment of the invention, the boot, especially in its clamping region at the joint outer member, is provided with recesses, apertures or the like which are circumferentially distributed across its diameter and which increase the resilience of the boot.

The invention is completed and perfected by an essential feature according to which the cap simultaneously serves as a sensor ring for the anti-blocking system (ABS) and, accordingly, is provided with apertures or with a tooth-like outer contour.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DESCRIPTION OF THE DRAWINGS

In the drawings:

FIG. 1 is a longitudinal sectional view showing part of a constant velocity universal joint embodying the present invention;

FIG. 2 is a longitudinal sectional view of a boot in accordance with the invention;

FIG. 3 is a longitudinal sectional view similar to that of FIG. 1 showing an embodiment of the invention with a shortened inner boot part; and FIG. 4 is a sectional view taken through a part of the boot shown in FIG. 2.

DETAILED DESCRIPTION OF THE PREFERRED EMBODIMENTS

Referring now to the drawings and more particularly to FIGS. 1, 2 and 4, there is shown a first embodiment of the invention, wherein a protective boot 2 is mounted in operative engagement with a constant velocity universal joint 1 which includes an outer joint member 1a and a driving shaft 1b. In a manner which will be described more fully hereinafter, the boot 2 is affixed on one side with the outer joint member 1a and on its other side with the driving shaft 1b. The boot 2 includes folds which are generally formed in a sawtoothed configuration and which furthermore are undercut-free. The boot 2 consists preferably of a material of low resilience, such as a material known under the tradename HYTREL. A further essential requirement of the invention with respect to the boot material is that it should be suitable for plastic injection or injection molding which makes it possible to use two-part molding tools.

As will be evident from FIGS. 1 and 2, the boot 2 comprises a smaller diameter end which consists essentially of an inwardly turned fold end 2a arranged facing the outer joint member 1a and which extends approximately parallel with a central axis 1c of the universal joint with the end 2a resting against the driving shaft 1b over a defined distance X, with the length of the defined distance X extending as far as the axial limit of an inner joint member (not shown). The other, outer or larger diameter end 2b of the boot 2 is essentially comprised of an axial portion 2d and of a radial portion defining a radial shoulder 2c. As will be best seen in FIG. 1, the radial shoulder 2c rests in sealing engagement against a correspondingly designed end face 1d of the outer joint member 1a and the axial portion 2d of the boot 2 adjoining the radial shoulder 2c is supported in sealing engagement on an outer circumference 1e of the outer joint member 1a.

In the region of its larger diameter outer end 2b, the boot 2 with its radial shoulder 2c and its axial portion 2d is embraced in secured engagement by a rotation-symmetrical and relatively thin metal cap 3. An inner diameter 3a of the metal cap 3 is somewhat smaller than a tensioning diameter of the outer joint member 1a.

In order to improve the sealing effect of the radial shoulder 2c relative to the outer joint member 1a, the boot 2 especially in its clamping-in region with the outer joint member 1a is provided with recesses or apertures 2e best seen in FIG. 4 which are circumferentially distributed across the diameter and which increase the resilience of the boot.

The metal cap 3 simultaneously serves as a sensor trigger ring for an anti-blocking system (ABS) known in itself. For this purpose, it is provided with apertures 3b or a tooth-like outer contour (not illustrated).

FIG. 3 shows another embodiment of the arrangement of the present invention, wherein there is involved a constant velocity universal joint essentially corresponding with that shown in FIG. 1. Accordingly, identical reference numerals have been used to identify similar parts. The difference in the embodiment of FIG. 3, however, is that in FIG. 3, the inner or smaller diameter inwardly turned fold end 2a of the boot 2 is shorter taken in the axial direction than that shown in FIG. 1 and FIG. 2. In order to compensate for the shorter length of the inner end 2a of the boot 2, as far as the axial limit in the joint inner part, the embodiment of FIG. 3 is provided with a sleeve 4 which may consist of cardboard or plastic. The sleeve 4 may be provided with elongate slots (not illustrated) and such elongate slots permit easier assembly of the constant velocity universal joint 1 in such a manner that the sleeve, in an expanded condition, may snap across the circumference of the driving shaft 1b. In view of the internal resilience of the sleeve 4, its slot automatically closes after it has been pushed onto the shaft 1b.

From the foregoing, it will be noted that the present invention provides a boot assembly which differs from the prior art and which provides several advantages. In order to more clearly understand in greater detail the advantages of the present invention over the prior art, it would seem helpful to consider in some greater detail the defects, disadvantages and limits of conventional prior art boots and their geometric configuration in order to compare these with the advantages of the present invention.

As a rule, the valleys of conventional boots have a clearly smaller diameter than the respective fold peaks. This means that there is a definite undercut in such boots and, as such, the boots are commonly made of highly resilient materials, such as rubber, with a certain Shore hardness. Thus, it is quite possible to form these boots with tools having an inner and outer part and to choose optimum boot wall thicknesses in relation to the outer contour of the boot. However, boots produced in this way are damaged relatively easy, for example, by stones. Furthermore, such boots have bad rotational stability.

If, instead of highly resilient materials, hard and unresilient materials are used, the boots can only be produced by so-called blowing processes which again means a divisible outer shape. When using such manufacturing processes, it is not possible to accurately adjust the wall thickness of the boot relative to its outer shape. The wall thickness of the fold peaks is usually thinner than that of the fold valleys. This leads to increased stresses and to uneven deformation behavior.

As compared with the foregoing, the advantages of the present invention consist in providing an undercut-free boot having several folds with the material selected for producing such a boot being a plastic material with a relatively low resilience, such as plastic material known under the tradename HYTREL. It is suitable for injection or injection molding. The wall thickness of such boots may be designed to be such that there are optimum stress and deformation conditions and, by using the aforementioned injection molding process, it is possible to operate with two-part molds.

Needless to say, there are advantages in addition to the ones mentioned above. One advantageous feature consists in making the inner boot part extend as far as the inner joint part. In this way, any hose or similar clips and beads on the shaft for fixing the boot may be completely eliminated. Furthermore, the invention permits accurate axial positioning of the boot on the shaft 1b.

As an alternative, it is advantageous to ensure the axial stop of the smaller boot diameter by making use of the sleeve 4 which is placed by sliding it onto the shaft 1b. Such a sleeve may be made of cardboard or plastic, for example, and it may be slotted as previously described to facilitate the process of being placed in sliding engagement on the shaft. However, a further advantage arises in that the amount of plastic material required for the boot is reduced. A further advantage results from the manner of fixing the larger or outer diameter boot end to the cylindrical outer joint member 1a. Such fixing is effected by means of an easy to produce and therefore cheap metal cap 3 whose axial fixing on the outer joint member together with the boot is achieved by means of the radial pretension and by making use of the internal resilience of the cap itself. To ensure axial fixing, it is advantageous to design the plane face of the metal cap in such a way that its inner diameter is smaller than the tensioning diameter of the outer joint member.

Furthermore, with a view toward providing a high degree of resilience and deformability, the boot is provided with the recesses or apertures 2e and this results in the overall advantage of the joint being fully sealed against the emergence of lubricant which in turn leads to a longer service life of the joint.

While specific embodiments of the invention have been shown and described in detail to illustrate the application of the inventive principles, it will be understood that the invention may be embodied otherwise without departing from such principles.

What is claimed is:

1. In a protective boot assembly particularly for a constant velocity universal joint having a driving shaft, an inner joint member, an outer joint member, rolling members which are guidable at half an angle of said joint through which torque is transmitted and a cage holding said rolling members, said protective boot assembly including a boot made of plastic material suitable for being injection molded bridging and sealing a free space between said driving shaft and driven parts of said joint, wherein rotation-symmetrical fixing and securing means embracing said boot are provided, the improvement comprising that said boot is formed with folds which are axially undercut-free arranged in a sawtooth-like cross-sectional configuration with said boot having an inner smaller diameter part inwardly turned facing toward said outer joint member and extending in sealing engagement against said driving shaft at least approximately parallel with a central axis of said universal joint over a defined distance, that said boot includes a larger diameter outer end provided with an axial portion and a radial portion defining a radial shoulder resting in sealing engagement against a correspondingly shaped end face formed on said outer joint member, with said axial portion of said larger diameter outer end of said boot adjoining said radial shoulder being supported in sealed engagement on an outer circumference of said outer joint member, and that said larger diameter outer end of said boot is arranged in secured engagement and surrounded by a rotation-symmetrical relatively thin cap making use of its own resilience, wherein said cap has an inner diameter which is samller than a tensioned diameter of said outer joint member, said inner smaller diameter part of said boot being designed without any fixing means in such a manner that it abuts said inner joint member by one of direct abutment and engaged thru a sleeve means provided between the end of said inner smaller diameter part and the axial limit of said joint member.

2. A boot according to claim 1, wherein said boot is provided in its larger diameter outer end with recesses circumferentially distributed across the diameter and increasing the resilience of said boot.

3. A boot according to claim 1, wherein said cap serves simultaneously as a sensor trigger ring for an anti-blocking system and accordingly is provided with apertures.

4. A boot according to claim 1, wherein said cap serves simultaneously as a sensor trigger ring for an anti-blocking system and is provided with a tooth-like outer contour.

* * * * *